(12) United States Patent
Mahoney et al.

(10) Patent No.: US 8,382,118 B2
(45) Date of Patent: Feb. 26, 2013

(54) MAGNETIC FLUID SEAL WITH CENTERING OF BEARING AND SHAFT BY COMPRESSIBLE MEMBER

(75) Inventors: David G. Mahoney, Londonderry, NH (US); Walter Helgeland, Charlton, MA (US)

(73) Assignee: Rigaku Innovative Technologies, Inc., Auburn Hills, MI (US)

( * ) Notice: Subject to any disclaimer, the term of this patent is extended or adjusted under 35 U.S.C. 154(b) by 353 days.

(21) Appl. No.: 12/575,933

(22) Filed: Oct. 8, 2009

(65) Prior Publication Data

US 2010/0090413 A1   Apr. 15, 2010

Related U.S. Application Data

(60) Provisional application No. 61/104,181, filed on Oct. 9, 2008.

(51) Int. Cl.
| | |
|---|---|
| *E04B 1/682* | (2006.01) |
| *F16J 15/32* | (2006.01) |
| *F16C 27/00* | (2006.01) |
| *F16C 27/04* | (2006.01) |

(52) U.S. Cl. ......... 277/316; 277/575; 384/536; 384/582

(58) Field of Classification Search .................. 277/316, 277/572–575, 910, 410; 384/536, 582; 33/316, 33/572–575, 910, 410
See application file for complete search history.

(56) References Cited

U.S. PATENT DOCUMENTS

| | | | | |
|---|---|---|---|---|
| 4,335,885 A * | 6/1982 | Heshmat | ...................... | 277/347 |
| 4,577,340 A * | 3/1986 | Carlson et al. | ................ | 378/132 |
| 4,629,919 A * | 12/1986 | Merkle | ........................... | 310/90 |
| 4,810,108 A * | 3/1989 | Yajima | .......................... | 384/488 |
| 4,824,122 A * | 4/1989 | Raj et al. | ........................ | 277/410 |
| 5,215,313 A * | 6/1993 | Yokouchi et al. | ............. | 277/410 |
| 5,235,227 A * | 8/1993 | Fazekas | .......................... | 310/51 |
| 5,340,122 A * | 8/1994 | Toboni et al. | ................. | 277/410 |
| 5,593,164 A * | 1/1997 | Mraz et al. | .................... | 277/410 |
| 5,606,475 A * | 2/1997 | Ishizuka | .................... | 360/99.08 |
| 5,826,885 A * | 10/1998 | Helgeland | ..................... | 277/302 |
| 5,975,536 A * | 11/1999 | Helgeland | ..................... | 277/410 |
| 6,199,867 B1 * | 3/2001 | Mahoney et al. | ............. | 277/410 |
| 6,247,701 B1 * | 6/2001 | Kitada et al. | .................. | 277/410 |
| 6,280,095 B1 * | 8/2001 | Furukoshi et al. | ............ | 384/489 |

(Continued)

FOREIGN PATENT DOCUMENTS

| | | |
|---|---|---|
| DE | 36 16 866 A1 | 1/1987 |
| EP | 0 986 714 | 3/2002 |

(Continued)

OTHER PUBLICATIONS

International Search Report—PCT/US2009/060000—mailed on Feb. 2, 2010.

*Primary Examiner* — Vishal Patel
*Assistant Examiner* — Nicholas L Foster
(74) *Attorney, Agent, or Firm* — Brinks Hofer Gilson & Lione

(57) ABSTRACT

The present disclosure describes a magnetic fluid sealing device having a shaft centered with respect to a magnetic structure and rolling element bearing, as well as a method for centering the shaft in the device. A compressible ring located in a groove on the shaft is used to partially fill the gap between the shaft and the rolling element bearing and to make contact with the rolling element bearing. The compressible ring aligns and centers the shaft with the rolling element bearing. A liquid locking material is added to the gap and hardened to couple the shaft and compressible ring to the rolling element bearing. An alternative self-alignment mechanism is also disclosed.

15 Claims, 4 Drawing Sheets

| U.S. PATENT DOCUMENTS | | | | FOREIGN PATENT DOCUMENTS | | |
|---|---|---|---|---|---|---|
| 6,558,042 B1 | 5/2003 | Tompkins | | EP | 0 929 764 | 5/2003 |
| 6,857,635 B1 * | 2/2005 | Li et al. ................. 277/410 | | EP | 1 898 133 | 3/2008 |
| 7,129,609 B1 * | 10/2006 | Mikhalev et al. ........... 310/90.5 | | GB | 1 243 234 A | 8/1971 |
| 7,188,542 B2 | 3/2007 | Yabe et al. | | WO | 98/14726 A | 4/1998 |
| 7,343,002 B1 | 3/2008 | Lee et al. | | | | |
| 7,398,974 B1 * | 7/2008 | Mikhalev et al. ........... 277/410 | | | | |
| 2011/0249922 A1 * | 10/2011 | Tsuchiya ................. 384/41 | | | | |

* cited by examiner

MAGNETIC FLUID SEAL WITH CENTERING OF BEARING AND SHAFT BY COMPRESSIBLE MEMBER

CROSS REFERENCE TO RELATED APPLICATIONS

This application claims the benefit of U.S. Provisional Application Ser. No. 61/104,181 filed on Oct. 9, 2008, entitled "MAGNETIC FLUID SEAL WITH CENTERING OF BEARING AND SHAFT BY COMPRESSIBLE MEMBER," the entire contents of which are incorporated herein by reference.

FIELD OF THE INVENTION

This disclosure relates generally to magnetic fluid seals, and more specifically to a method for centering the seal about a rotatable shaft, sleeve, or the like.

BACKGROUND OF THE INVENTION

Magnetic fluid seals are commonly utilized to provide a seal that will protect devices against the introduction of gas or other contaminants. These seals may be installed to provide a barrier between various components present in a device that are either stationary with respect to each other or in a rotational relationship. For example, magnetic fluid seals have been utilized in computer magnetic disc storage units as a barrier against contaminants being transmitted between the motor area and the disc area. Magnetic fluid seals also have been designed to seal robotic actuators and to seal around rotatable x-ray tubes that are used in high vacuum environments, as well as to seal rotary components incorporated into pumps used in refineries and chemical plants.

Magnetic fluid seals generally operate through the placement of a magnetic fluid (e.g., a ferrofluid) in the gap established between the surface of a rotating shaft and stationary surface for use as a dynamic seal. The stationary surface normally includes an annular magnetic structure whose peripheral edge forms a close, non-contacting gap with the surface of the rotating shaft. The magnetic flux path generated by the magnet retains and concentrates the magnetic fluid in the gap forming a tight seal that resembles a liquid o-ring. Since the rotating and stationary surfaces do not directly contact each other, they are subject to very little wear. Thus the serviceable life of the magnetic fluid seal is remarkably extended in comparison to the life expectancy of a mechanical seal.

In order for a magnetic fluid seal to operate properly, it is important that the annular magnetic structure, including any magnets and corresponding pole pieces, is mounted concentrically about the rotatable shaft. Inaccurate centering about the shaft will result in a non-uniform width in the annular gap established between the magnetic structure and the shaft. Generally, it is the pole pieces which are in closest proximity with a shaft and for which centering is most critical.

When a magnetic seal is mounted non-concentrically about the shaft, the resulting magnetic field will not be symmetrically distributed about this shaft, but rather the magnetic flux will be elevated near the narrowest portion of the gap and reduced near the gap's widest portion. An uneven distribution of magnetic flux within the annular gap may cause the magnetic fluid to concentrate towards the narrowest portion of the gap, thereby, leaving the widest portion of the gap with an insufficient volume of fluid to maintain the desired sealing strength. A reduction in sealing strength can lead to seal "bursting" at a lower threshold pressure differential across the seal than one skilled-in-the-art would normally expect or predict. Accordingly, there exists a continual desire and need to provide magnetic fluid sealing devices, and a method of centering the magnetic seals about rotatable shafts.

SUMMARY OF THE INVENTION

The present disclosure provides a magnetic fluid sealing device having a shaft centered with respect to a magnetic structure and to a rolling element bearing, as well as a method for centering the shaft in the device. One embodiment of a magnetic fluid sealing device, constructed in accordance with the teachings of the present disclosure, generally comprises a housing; a shaft having a first portion and a second portion along its longitudinal axis (x); a magnetic structure having a cylindrical channel sized to encircle the first portion of the shaft, thereby, forming a first radial gap; a magnetic fluid located within the first gap; a compressible ring; and a rolling element bearing having an inner ring and an outer ring, the inner ring being sized to encircle the second portion of the shaft, thereby, forming a second radial gap. The outer surface of the magnetic structure and the outer ring of the rolling element bearing are coupled to the housing such that the center of the inner ring of the rolling element bearing and the center of the cylindrical channel in the magnetic structure are coaxially aligned.

The outer surface of the shaft in its second portion includes at least one groove radially encircling the shaft in which a compressible ring is located or seated. The compressible ring is further adapted to fill a part of the second gap and to contact the inner ring of the rolling element bearing. The contact between the compressible ring and the inner ring of the rolling element bearing radially aligns and centers the shaft along its longitudinal axis (x) with the bearing, while the magnetic fluid establishes a seal between the magnetic structure and the shaft.

According to another aspect of the present disclosure, a hardenable locking material is placed into the second gap. This locking material upon hardening couples the shaft and the compressible ring to the inner ring of the rolling element bearing. Optionally, the shaft/bearing assembly may be placed into an external fixture to maintain alignment between the shaft and the bearing while the locking material hardens.

According to yet another aspect of the present disclosure, the shaft may include a shoulder upon which the groove and compressible ring reside. The surface of this shoulder is square or normal to the longitudinal axis of the shaft. This shoulder in conjunction with the compressible ring can center and align the shaft and the roller bearing, as well as maintain such alignment while the locking material hardens without the use of an external fixture.

Another objective of the present disclosure is to provide a method of assembling the magnetic fluid sealing device described herein. This method generally provides a shaft with at least one groove in which a compressible ring is fit or seated, a magnetic structure, and a rolling element ring in which the center of the concentric channels of each are coaxially aligned when coupled with the housing. The insertion of the shaft into the magnetic structure establishes a first radial gap, while the insertion of the shaft into the inner ring of the rolling element bearing establishes a second radial gap. The insertion of the shaft through the inner ring of the rolling element bearing is done such that the compressible ring fills part of the second gap and makes contact with the inner ring. This contact with the inner ring allows the compressible ring to radially align and center the shaft along its longitudinal axis (x) with the rolling element bearing. A magnetic fluid is placed into the first gap in order to establish a seal between the magnetic structure and the shaft. A hardenable locking material is added to the second gap. When this locking material hardens, it couples the shaft and compressible ring to the inner ring of the rolling element bearing.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE INVENTION

Figure 1:
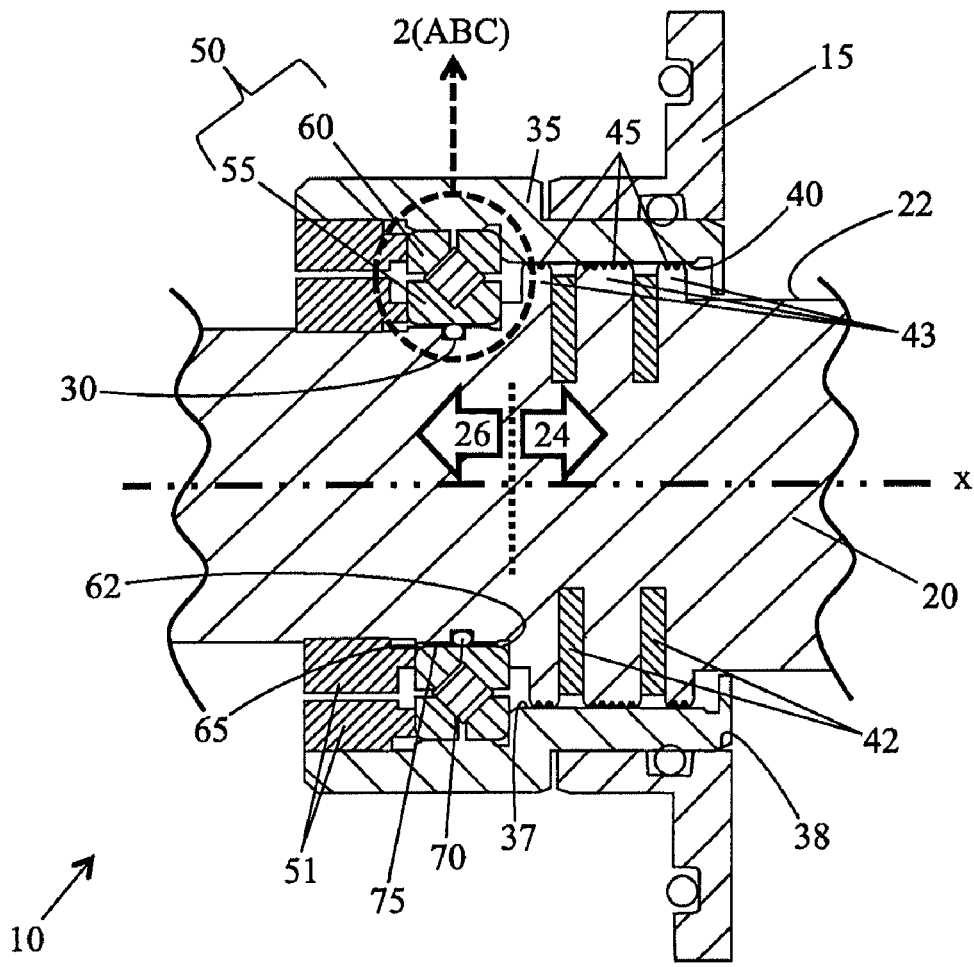
FIG. 1 is a cross-sectional schematic of a magnetic fluid sealing device constructed according to the teachings of the present disclosure.

The following description is merely exemplary in nature and is in no way intended to limit the present disclosure or its application or uses. It should be understood that throughout the description and drawings, corresponding reference numerals indicate like or corresponding parts and features.

The present disclosure generally provides a magnetic fluid sealing device for incorporation into an apparatus having rotatable components. More specifically, the magnetic fluid sealing device uses a rolling element bearing that is aligned and centered with a rotatable shaft through the use of a compressible ring and/or shoulder located on the surface of the shaft. The use of such a compressible ring or shoulder on the shaft allows one to quickly establish a small, circumferentially uniform gap between an inner surface of a magnetic structure in the magnetic sealing device and the outer surface of a rotatable shaft. The magnetic sealing device of the present disclosure overcomes the various drawbacks and problems associated with conventional approaches to centering a rotatable shaft in a magnetic sealing device.

Referring to FIG. 1, the magnetic sealing device 10 comprises a housing 15 mounted to an apparatus in which a magnetic structure 35 and a rolling element bearing 50 are coupled. A shaft 20 is also rotatably mounted in this housing 15. The shaft 20 is defined as having an outer surface 22 divided into a first portion 24 and a second portion 26 along its longitudinal axis (x), such that the delineation between the first portion 24 and second portion 26 resides between the magnetic seal and rolling element bearing 50. The outer surface 22 of the shaft 20 in its second portion 26 has at least one groove 30 that encircles the shaft 20. A compressible ring 70 whose cross-sectional diameter is greater than the depth of the groove 30 is located or seated in this groove 30. The magnetic fluid sealing device 10 as shown in FIG. 1 is symmetrical around the shaft 20.

The housing 15 may be mounted to an apparatus using any known means known to one skilled-in-the-art, such as a flange and bolt combination, among others. The housing 15 is normally constructed out a metal, the composition of which can vary depending upon the application and desired performance characteristics. However, the housing 15 may be constructed out of any material, including metal or composites, as desired.

The magnetic structure 35 is defined by an inner surface 37 and an outer surface 38. The outer surface 38 of the structure 35 is coupled to the housing 15. The inner surface 37 of the structure 35 is sized to have a diameter that encircles the outer surface 22 of the shaft 20 along its first portion 24, thereby, creating a first radial gap 40. A magnetic fluid 45 is located in this first gap 40 to establish a seal between the magnetic structure 35 and the shaft 20.

The rolling element bearing 50 is defined by an inner ring 55 and an outer ring 60. The outer ring 60 represents the part that is coupled to the housing 15. Retainers 51 may be used to secure the inner ring 55 and outer ring 60 of the rolling element 50 bearing in place. The inner ring 55 has an inner surface 62 that is sized to have a diameter that encircles the outer surface 22 of the shaft 20 along its second portion 26, thereby creating a second radial gap 65.

Figure 2:
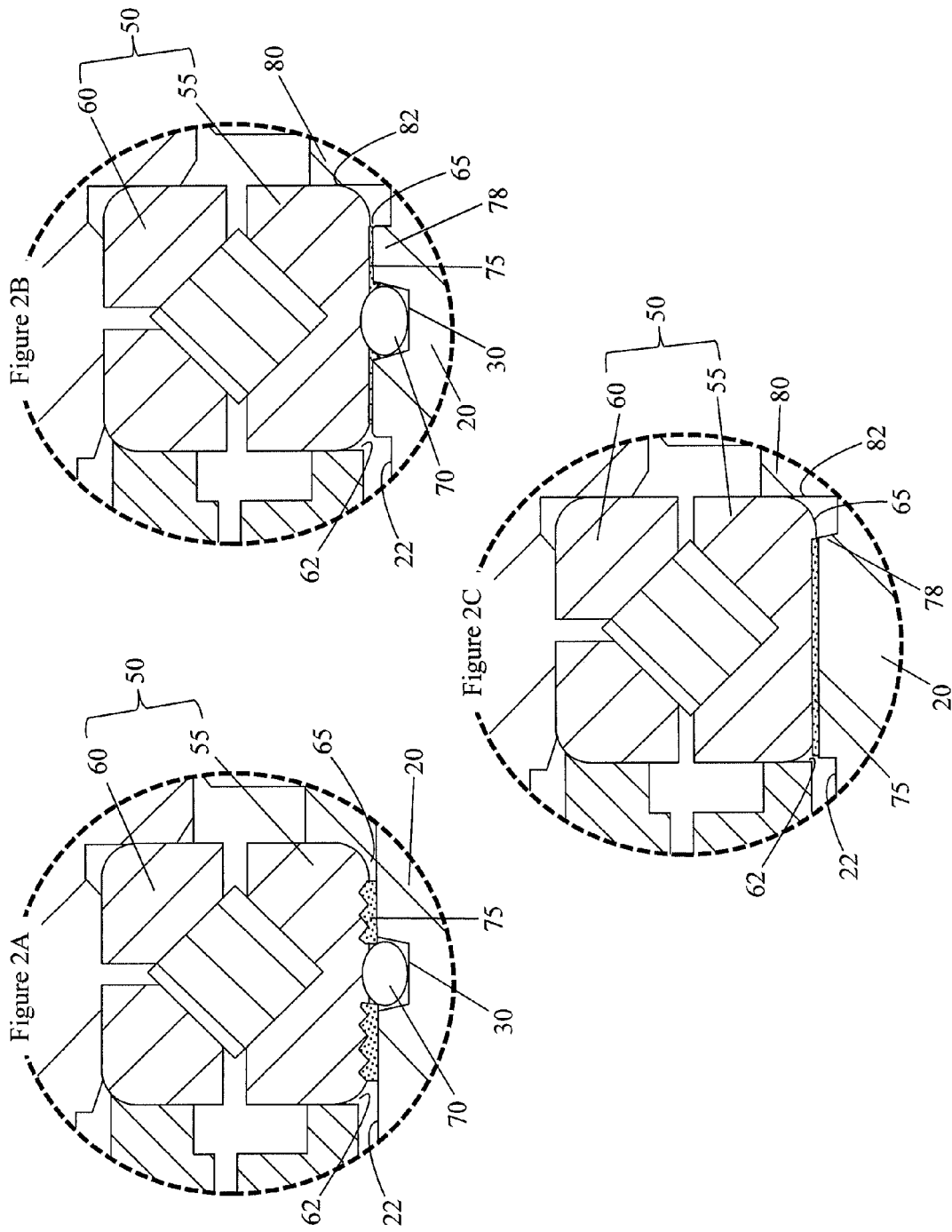
FIG. 2A is a magnified view of section 2(ABC) of the sealing device of FIG. 1 highlighting the second gap formed between the rolling element bearing and the shaft according to one embodiment of the present disclosure.
FIG. 2B is a magnified view of section 2(ABC) of the sealing device of FIG. 1 highlighting another aspect of the present disclosure.
FIG. 2C is a magnified view of section 2(ABC) of the sealing device of FIG. 1 highlighting yet another aspect of the present disclosure.

Referring now to FIGS. 1 and 2A, the compressible ring 70, which is located in the groove 30 on the shaft 20, is adapted to fill a portion of the second gap 65 and contact the inner ring 55 of the rolling element bearing 50. It is this compressible ring 70 that radially aligns and centers the shaft 20 along its longitudinal axis (x) with the rolling element bearing 50.

One skilled-in-the-art will understand that the first portion 24 of the shaft 20 is part of the magnetic circuit created during the functioning of the magnetic fluid seal and therefore is preferably constructed of a magnetically permeable material. The first portion 24 of the shaft 20 may incorporate magnets 42 and pole pieces 43 as shown in FIG. 1. In this case, the magnets 42 and pole pieces 43 will rotate with the shaft 20 and define the outer surface 22 of its first portion 24. A pole piece 43 represents the portion of a magnetically permeable material through which the lines of magnetic flux become concentrated. In the magnetic fluid device of the present disclosure, the pole pieces are typically located near the surface of the shaft 20 and magnetic structure 35 in order to effectively attract and retain any magnetic fluid that is present in the first radial gap 40.

Magnetic stainless steel is the preferred material for the outer surface 22 of shaft 20 because it provides a desirable combination of properties, such as cleanliness, vacuum compatibility, ferromagnetic permeability, and relatively poor thermal conductivity. The preferred magnetic stainless steel is 17-4PH alloy, also known as alloy 630. Stainless steel alloys of the so-called 400 series can also be used, and may be desired in some applications, such as applications where a very high hardness is desirable. Magnetic alloys other than stainless steel may be used, but are not normally desired for use in many applications because of their incompatibility with a high vacuum environment or other process environments (e.g., corrosive gases).

The shaft 20 may be solid or hollow depending upon the function of the apparatus in which the magnetic fluid sealing device is utilized. In other words, the core of the shaft 20 may when desired further define a passageway, channel, duct, or conduit. Thus the shaft 20, which is typically cylindrical in shape, may be one selected from the group of a rod, an axle, a tube, a sleeve, and a pipe. The shaft 20 may be rotationally driven by a motor or other means (not shown).

As shown in FIG. 1, the magnetic structure 35 may be comprised of a magnetically permeable material, such as magnetic stainless steel. The inner surface 37 of the magnetic structure acts as a pole piece 42 with respect to concentrating the magnetic flux to attract and retain the magnetic fluid 45 present in the first radial gap 40. In this case, the outer surface 22 of the rotatable shaft 20 in its first portion 24 will need to be comprised of both magnets 42 and pole pieces 43 in order to complete a magnetic circuit. The magnetic structure 35 is preferably arranged, such that its inner surface 37 forms a small clearance or first gap 40 with the outer surface 22 of the shaft 20. Thus the magnetic structure 35 forms a cylindrical cavity whose diameter is slightly larger than the outside diameter of shaft 20. This type of magnetic circuit is generally called a "SuperSeal" configuration.

Alternatively, the magnetic structure 35 may be comprised of a combination of annular magnets 42 and pole pieces 43 of a magnetically permeable material, such as magnetic stainless steel. In this case, the outer surface 22 of the shaft 20 in the first portion 24 will be a pole piece 43 or combination of pole pieces 43 made from a magnetically permeable material. The magnets 42 in this alternative arrangement remain stationary as the shaft 20 rotates. This type of magnetic circuit is generally called a "Stationary Pole Piece" configuration. Thus one skilled-in-the-art will understand that the magnetic sealing device 10 of the present disclosure may include arrangements where the magnets 42 and pole pieces 43 are either part of the magnetic structure 35 and remain stationary upon the rotation of the shaft 20 or are part of the shaft's 20 first portion 24 and rotate with the shaft 20.

The distance between the magnetic structure 35 and shaft 20, which establishes the first radial gap 40, may be on the order of about 0.001 to 0.004 inches. The magnets 42 are arranged so that the polarity of the magnets 42 on the opposite side of the pole piece 43 is symmetrical with respect to the pole piece 43. Thus, the polarity of the opposite surfaces of the two adjoining magnets 42 is the same as each other.

Rare earth magnets 42, such as SmCo or NdBFe, are preferred. These magnets 42 can be used as a single component or arranged in layers. Any number of magnet layers can be used, but an even number is preferred (for cancellation of fringe fields). One layer is sufficient for all vacuum applications, although two layers are normally desirable. For applications with large pressure differentials, a greater number of layers can be used. The surface of the pole pieces 43 may be continuous along the longitudinal axis of the magnetic seal. Such a continuous surface may include the presence of one more grooves, commonly referred to as pole tips.

A magnetic circuit is established by the combination of the magnetic structure 35, the first portion 24 of the shaft 20, and the magnetic fluid 45. The magnetic field created by the magnet 42 follows a flux path through the pole pieces 43 in the shaft 20 and magnetic structure 35. The flux path extends across the first radial gap 40 in which the magnetic fluid 45 is located. The magnetic flux retains the magnetic fluid 45 in the gap 40, thereby forming a liquid o-ring seal around shaft 20.

One skilled-in-the-art will understand that the magnetic fluid 45 may be any ferrofluid composition known to function as a magnetic seal. Such magnetic fluids 45 generally comprise a carrier fluid such as water, a hydrocarbon, or a fluorocarbon; ferromagnetic particles, such as iron oxide or ferrite dispersed in the carrier fluid; and a surfactant, such as a fatty acid, to assist in the dispersion of the particles. The magnetic fluid 45 is placed in the first radial gap 40.

The cylindrical cavity formed by the magnetic structure 35 is coaxially aligned with the cavity formed by the inner ring 55 of the rolling element bearing 50. Since the alignment of the shaft 20 is accomplished with the use of the rolling element bearing 50, when the magnetic structure 35 is positioned within the housing 15 and affixed thereto, the magnetic structure 35 is, ideally, automatically centered about the shaft 20. The rolling element bearing 50 has a predetermined amount of stiffness that provides a resistance large enough to offset the occurrence of any radial loading or force moments which could tilt the shaft 20 once the shaft 20 and roller element bearing 50 are coupled according to the teachings of the present disclosure.

Rolling element bearings 50 with large radial and axial play (e.g., radial ball bearings) should be avoided in favor of preloaded bearings. In order to achieve high stiffness in conventional preloaded bearing sets, it is usually necessary to spread the bearings apart axially by means of matched-length spacers. However, the use of such spacers generally increases the overall length of the feed through and results in the bearing occupying a greater amount of space in the overall magnetic fluid sealing device. The bearing preferred in this embodiment is a rolling element bearing 50 of the type manufactured by THK Corporation, Tokyo, Japan, which offers very high stiffness in an extremely short axial space.

The magnetic fluid seal established through the magnetic fluid 45 in the first gap 40 may be used to separate a low pressure region in an apparatus from a region in the apparatus that is at atmospheric pressure. The rolling element bearing 50 and second portion 26 of the shaft 20 are preferably located on the atmospheric pressure side of the magnetic fluid seal. The magnetic fluid seal may also be used to separate a region of corrosive or toxic gas from a region exposed to the atmosphere or environment.

The rolling element bearing 50 is of the "negative clearance" type in order to eliminate shaft 20 wobble within the magnetic structure 35 when the magnetic fluid sealing device 10 is fully assembled. Conventional manufacturing tolerances for the bearing's inner rings and shafts lead to some combinations of an inner ring and shaft in which the inner ring has been radially strained, thereby, increasing the effective negative clearance in the bearing. When the shaft and bearing are mounted in the housing, a large negative clearance can lead to large bearing loading and high torque being required to turn the bearing. One method of avoiding this situation is to select shafts and bearings as a matched set, in which such radial straining has not occurred. Although such a selection process could be effective, it will also be very expensive.

According to one aspect of the present disclosure, an improved method to avoid this situation is to control the shaft manufacturing such that the shafts 20 with the largest diameters are suitably matched to bearings 50 with inner rings 55 that have the smallest inner diameter. However, in this method, all of the other shaft/bearing sets will have a looser fit (e.g., larger inner diameter of the inner ring 55 and smaller diameter of the shaft 20). The magnetic fluid sealing device 10 of the present disclosure provides a means to easily overcome this situation.

Referring again to FIGS. 1 and 2A, the second portion 26 or bearing journal in the shaft 20 is made with at least one groove 30 into which a compressible ring 70 is seated. When inserted into the bearing 50, the compressible ring 70 is squeezed out to partially fill the space available in the second radial gap 65 established between the inner surface 62 of the bearing's inner ring 55 and the outer surface 22 of the shaft 20. This provides approximate alignment of the shaft 20 with the bearing 50 along its longitudinal axis. The amount of radial force required to compress the ring 70 is not enough to radially strain the bearing's inner ring 55.

One skilled-in-the-art will understand that the compressible ring 70 may be made from any known elastomeric or polymeric resin system, including but not limited to one selected from the group of epoxies, polyesters, butyl rubbers, silicones, polyethers, polyurethanes, polyolefins, styrene block copolymers, polyvinyl chlorides, and mixtures or copolymers thereof. The compressible ring 70 is substantially similar to an o-ring. The compressible ring 70, which is seated in the groove 30 present in the second portion 26 of the shaft 20, has a cross-sectional diameter that is larger than the depth of the groove 30.

To set the final alignment, a liquid locking material 75 is added to fill any remaining small openings in the second radial gap 65 established between the outer surface 22 of the shaft 20 and inner surface 62 of the bearing's inner ring 55 as shown in FIGS. 1 and 2A. This final alignment may be accomplished if desired by mounting the shaft/bearing assembly in a fixture that forces the shaft 20 and the bearing 50 into the desired final relationship. When the locking material 75 has hardened the shaft/bearing assembly is removed from the fixture and can be used in a magnetic liquid sealing device 10.

The hardened locking material 75 couples the shaft 20 and the compressible ring 70 to the inner surface 62 of the inner ring 55 of the rolling element bearing 50. Once the shaft 20 and rolling element bearing 50 are coupled together by the hardened locking material 75, the stiffness of this coupling is capable of providing the resistance necessary to offset the tilting of the shaft 20 upon the occurrence of a radial loading or force moment. Tilting of the shaft 20 should be avoided because such an occurrence would move the shaft 20 substantially off-center with respect to the magnetic structure 35, thereby, weakening the dynamic seal.

The liquid locking material 75 may be any hardenable or curable adhesive, sealant, or other material system known to one skilled-in-the-art. The liquid locking material 75 is selected to be compatible with the elastomeric or polymeric resin system that comprises the compressible ring 70. Several examples of adhesive and sealant systems that may be used according to the teachings of the present disclosure include, but are not limited to epoxy, polyester, silicone, polyether, polyurethane, and acrylic adhesives and sealants, as well as mixtures or copolymers thereof.

The compressible ring 70 of the present invention is very useful in performing the centering function. This ring 70 centers the shaft 20 along its longitudinal axis (x) with the inner ring 55 of the rolling element bearing 50. The centering of a magnetic sealing device 10 about a rotatable shaft 20 is affected by the accuracy of the registration that one establishes between the shaft 20 and support bearing 50, as well as between the shaft 20 and the magnetic structure 35. Since the magnetic structure 35 and the support bearing 50 are usually coupled in a common housing 15, the accuracy of centering the rotatable shaft 20 relies upon the accuracy of centering the shaft 20 in the housing 15.

The centering of the shaft 20 in the housing 15 is accomplished by ensuring that the center of the concentric circle established by the inner surface 62 of the inner ring 55 and the center of the concentric circle established by the magnetic structure 35 are coaxially aligned upon their being coupled with the housing 15. The alignment of the shaft 20 by the compressible ring 70 also allows for the formation of a small, substantially circumferentially uniform first radial gap 40 between the inner surface of the magnetic structure 35 and the outer surface 22 of a shaft 20.

Referring now to FIG. 2B, the shaft 20 in its second portion 26 may optionally comprise a shoulder 80 that encircles the shaft 20 and is inherently formed therewith. Preferably, the surface 82 of the shoulder 80 is square or normal to longitudinal axis (x) of the shaft 20 and therefore can be used to assist in the alignment of the shaft 20 and the inner ring 55 of roller bearing 50. In this case, the use of a fixture to maintain alignment while the locking material hardens is not necessary because the shoulder 80 can be used to align the shaft 20 and the bearing 50, while the compressible ring 70 holds the shaft 20 and bearing 50 together during the time required for the locking material 75 to harden. However, a fixture can still be utilized when desirable.

The shaft 20 may be substantially flat along its longitudinal axis (x) before, after, and throughout the region in which the second radial gap 65 is established with the inner ring 55 of the roller bearing 50 as shown in FIG. 2A. Optionally the shaft 20 may further comprise a raised portion 78 that establishes the second radial gap 65 with the inner ring 55 of the roller bearing 50 as shown in FIG. 2B. With respect to this latter case, the groove 30 and compressible ring 70 are located within the raised portion 78 of the shaft 20.

Referring now to FIG. 2C, the magnetic sealing device 10 according to another aspect of the present disclosure may include the ability to self-align the shaft 20 and the rolling element bearing 50 without the use of a compressible ring. This self-alignment mechanism involves only the shaft 20 having a shoulder 80 that is square or normal to the shaft's longitudinal axis (x). The bearing 50 is mounted solidly against this shoulder, ensuring that the shaft 20 and bearing 50 axes are parallel. The shaft 20 may optionally comprise a raised portion 78 as previously described.

More specifically, the magnetic fluid sealing device 10 comprises a housing 15 mounted in the apparatus; a shaft 20 rotatably mounted in the housing 15; a magnetic structure 35; a magnetic fluid 45; and a rolling element bearing 50. The shaft 20 has an outer surface 22 that defines a first portion 24 and a second portion 26 along its longitudinal axis (x). Referring to FIG. 2C, the outer surface 22 of the shaft 20 in the second portion 26 has a shoulder 80 that encircles the shaft 20. The surface 82 of the shoulder 80 is square or normal to the longitudinal axis (x) of the shaft 20.

The rolling element bearing 50 has an inner ring 55 and an outer ring with the outer ring 60 being coupled to the housing 15 and the inner ring 55 being rotatable in relation to the outer ring 60. The inner ring 55 has an inner surface 62 that is sized to encircle the outer surface 22 of the shaft 20 along its second portion 26 and to contact the outer surface 22 of shaft 20. The contact that occurs between the inner surface 62 of the inner ring 55 and the outer surface 22 of shaft 20 radially aligns and centers the shaft 20 along its longitudinal axis (x) with the rolling element bearing 50.

In this case, the absence of a compressible ring that can hold the shaft 20 and bearing 50 together while the locking material 75 hardens can be overcome through the use of an external fixture. Such a fixture will need to hold the shaft 20 and bearing 50 in accurate alignment while the locking material 75 hardens. Although possible, the use of an accurate fixture may not be desirable in many applications due to the cost associated with the fixture and the difficulty associated with utilizing the fixture in a full-scale, mass production environment.

One skilled-in-the-art will understand that the centering mechanism of the present invention may be utilized in a variety of applications in which a magnetic fluid sealing device 10 provides a ferrofluid seal around a rotatable shaft 20. Examples of such applications include, but are not limited to, sputtering systems, CVD equipment, ion implantation equipment, etching systems, x-ray apparatus, epitaxial growth systems, and vacuum transport systems.

During the operation of the apparatus in which the shaft 20 is rotated and the magnetic sealing device 10 provides a sealing function, the generation of heat will occur. In order for the magnetic seal to function as desired, preferably, the generation of heat is either minimized or removed from the device 10. Thus the magnetic sealing device 10 may further comprise a combination of thermal resistors, shunts, and heat sinks to reduce or minimize any build-up of heat within the device 10. In addition, the housing 15 of the magnetic sealing device 10 may include a water cooling mechanism (not shown) that will remove heat generated in the device 10 when the shaft 20 is rotated.

Figure 3:
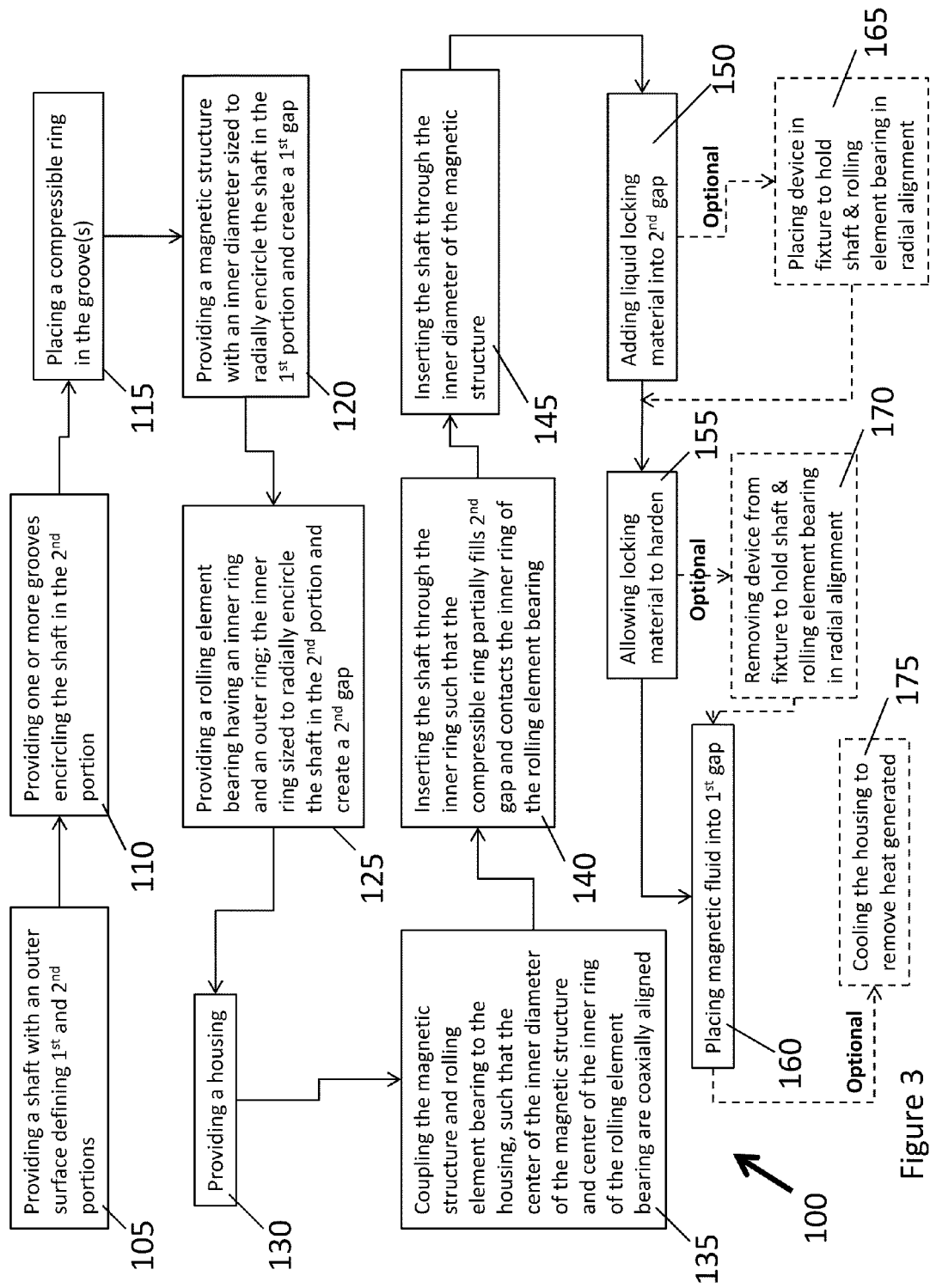
FIG. 3 is a schematic representation of a method for assembling the magnetic fluid sealing device of FIGS. 1, 2A, and 2B according to the teachings of the present disclosure.

It is another objective of the present disclosure to provide a method of assembling a magnetic sealing device 10 for use in an apparatus having rotatable components. Referring to FIG. 3, this method 100 comprises the step of providing 105 a shaft 20 having an outer surface 22 that defines a first portion 24 and a second portion 26 along its longitudinal axis (x). With respect to the first portion 24, the method 100 further comprises the step of providing 120 a magnetic structure 35 having an inner diameter 37 that is sized to encircle the outer surface 22 of the shaft 20, thereby creating a first radial gap 40.

With respect to the second portion 26, the method 100 comprises the step of providing 110 at least one groove 30 that encircles the shaft 20 and places 115 a compressible ring 70 in the groove 30. The cross-sectional diameter of the compressible ring 70 is greater than the depth of the groove 30. The method 100 further includes the step of providing 125 a rolling element bearing 50 having an inner ring 55 and an outer ring 60. The inner ring 55 has an inner diameter 62 sized to encircle the outer surface 22 of the shaft 20, thereby, creating a second radial gap 65.

The method 100 further includes the step of providing 130 a housing 15 to which the outer diameter 38 of the magnetic structure 35 and the outer ring 60 of the rolling element bearing 50 is coupled. The step of coupling 135 the magnetic structure 35 and roller bearing 50 to the housing 15 is done such that the radial center of the annular magnetic structure 35 is coaxially aligned with the radial center of surface the annular inner ring 55 of the rolling element bearing 50.

The method 100 further comprises the step of inserting 140 the shaft 20 through the inner ring 55 of the rolling element bearing 50 such that the compressible ring 70 fills part of the second radial gap 65 and makes contact with the inner ring 55 of the rolling element bearing 50. Thus the compressible ring 70 radially aligns and centers the shaft 20 along its longitudinal axis (x) with the rolling element bearing 50.

The method 100 also includes the step of inserting 145 the shaft 20 through the inner surface 37 of the magnetic structure 35. The method 100 further comprises the steps of adding 150 liquid locking material 75 into the second gap 65 and allowing 155 the locking material 75 to harden. The hardened locking material 75 couples the shaft 20 and compressible ring 70 to the inner ring 55 of the rolling element bearing 50. Finally, the method 100 further includes placing 160 a magnetic fluid 45 into the first gap 40, wherein the magnetic fluid 45 establishes a seal between the magnetic structure 35 and the shaft 30.

According to another aspect of the present disclosure, the method 100 may optionally include the step of placing 165 the magnetic fluid sealing device 10 into an external fixture in order to hold the shaft 20 and rolling element bearing 50 in radial alignment while the locking material 75 hardens. Once the locking material 75 hardens, the method 100 further includes the step of removing 170 the magnetic fluid sealing device 10 from the fixture.

According to yet another aspect of the present disclosure, the method 100 may further comprise the step of cooling 175 the housing 15 to remove heat generated in the device 10 when the shaft 20 is rotated.

Figure 4:
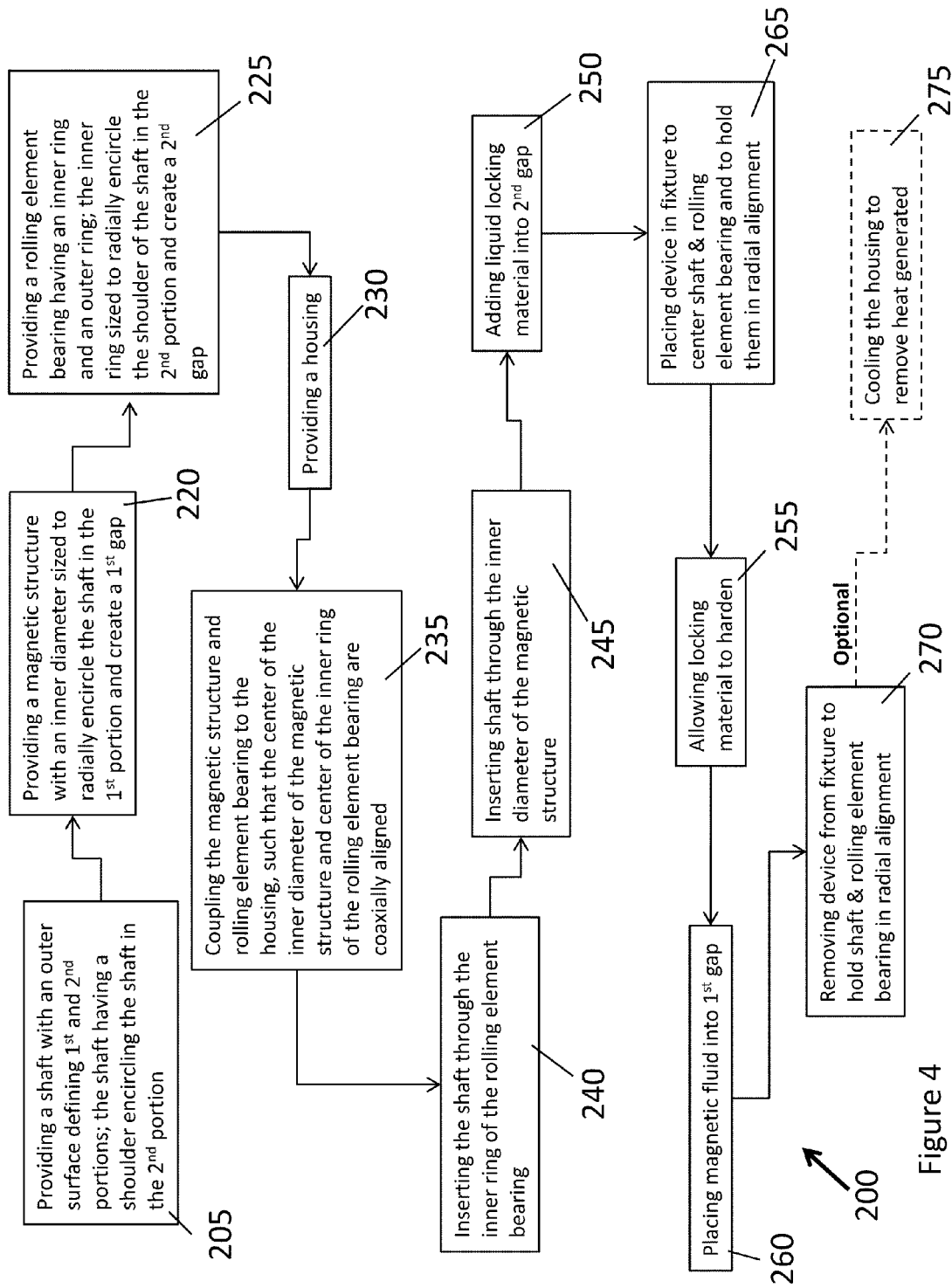
FIG. 4 is a schematic representation of a method for assembling the magnetic fluid sealing device of FIG. 2C according to another aspect of the present disclosure.

Another embodiment of the present disclosure provides a method 200 for assembling a magnetic fluid sealing device 10 in which the self-assembling mechanism of FIG. 2C where only a shoulder 80 on the shaft 20 is used to align the shaft 20 and roller bearing 50. Referring to FIG. 4, this method 200 generally includes the step of providing 205 a shaft 20 having an outer surface 22 that defines a first portion 24 and a second portion 26 along its longitudinal axis (x). A shoulder 80 is provided on the outer surface 22 of the shaft 20 in the second portion 26. The surface 82 of the shoulder 80 is square or normal to the longitudinal axis (x) of the shaft 20.

The method 200 further comprises the step of providing 220 a magnetic structure 35 having an inner surface 37. The inner surface 37 of the structure 35 is sized to encircle the outer surface 22 of the shaft 20 along its first portion 24, thereby creating a first radial gap 40.

The method 200 further includes the step of providing 225 a rolling element bearing 50 having an inner ring 55 and an outer ring 60; the inner ring 55 having an inner surface 62 sized to encircle the outer surface 22 of the shaft 20 along its second portion 26.

The method 200 further includes the step of providing 230 a housing 15 to which the magnetic structure 35 and the outer ring 55 of the rolling element bearing 50 is coupled. The step of coupling 235 the magnetic structure 35 and roller bearing 50 to the housing 15 is done such that the radial center for the annular magnetic structure 35 is coaxially aligned with the radial center for the annular inner ring 55 of the rolling element bearing 50.

The method 200 also comprises the step of inserting 240 the shaft 20 through the inner ring 55 of the rolling element bearing 50 such that surface 82 of the shoulder 80 on the shaft 20 makes contact with the inner surface 62 of the inner ring 55 of the rolling element bearing 50. The contact between the shoulder 80 on the shaft 20 and the inner ring 55 of the rolling element bearing 50 axially aligns the shaft 20 along its longitudinal axis (x) with the rolling element bearing 50.

The method 200 further includes inserting 245 the shaft 20 through the inner surface 37 of the magnetic structure 35. The method 200 further comprises the steps of adding 250 liquid locking material 75 into the second gap 65 and allowing 255 the locking material 75 to harden. The method 200 also includes the step of placing 265 the magnetic fluid sealing device 10 into an external fixture in order to hold the shaft 20 and rolling element bearing 50 in radial alignment while the locking material 75 hardens. The hardened locking material 75 couples the shaft 20 to the inner ring 55 of the rolling element bearing 50. Once the locking material 75 hardens, the method 200 further includes the steps of removing 270 the magnetic fluid sealing device 10 from the fixture and placing 160 a magnetic fluid 45 into the first radial gap 40. The magnetic fluid 45 establishes a seal between the magnetic structure 35 and the shaft 20.

Optionally, the method 200 may further comprise the step of cooling 275 the housing 15 to remove heat generated in the device 10 when the shaft 20 is rotated.

A person skilled in the art will recognize that any measurements described are standard measurements that can be obtained by a variety of different test methods. Any test methods described in the present disclosure represent only one available method to obtain each of the desired measurements.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A magnetic fluid sealing device for incorporation into an apparatus having rotatable components; the sealing device comprises:
   a housing mounted to the apparatus;
   a shaft rotatably mounted in the housing; the shaft having an outer surface that defines a first portion and a second portion along its longitudinal axis (x); the outer surface of the shaft in the second portion having at least one groove that encircles the shaft;
   a magnetic structure having an inner surface; the structure being coupled to the housing; the inner diameter of the structure sized to encircle the outer surface of the shaft along its first portion, thereby creating a first radial gap;
   a magnetic fluid located in the first gap;
   one rolling element bearing having an inner ring and an outer ring; the outer ring being coupled to the housing; the inner ring having an inner diameter sized to encircle the outer surface of the shaft along its second portion, thereby creating a second radial gap; and
   a compressible ring located in the groove of the shaft; the compressible ring adapted to fill a part of the second gap and contact the inner ring of the rolling element bearing; and
   a hardenable locking material filling a part of the second gap, the hardenable locking material extending axially beyond the groove;
   wherein the compressible ring radially aligns and centers the shaft along its longitudinal axis (x) with the rolling element bearing;
   wherein when the locking material hardens, it couples the shaft and compressible ring to the inner ring of the rolling element bearing;
   wherein the magnetic fluid establishes a seal between the magnetic structure and the shaft.

2. The magnetic fluid sealing device of claim 1, wherein the shaft in the second portion further comprises a shoulder that encircles the shaft and is intimately formed therewith; the surface of the shoulder being normal to the longitudinal axis (x) of the shaft.

3. The magnetic fluid sealing device of claim 1, wherein the magnetic structure further comprises a combination of pole pieces and magnets with the pole pieces and the outer surface of the shaft in its first portion being made from a magnetically permeable material; wherein the magnets remain stationary when the shaft is rotated.

4. The magnetic fluid sealing device of claim 1, wherein the magnetic structure further comprises a single pole piece or a combination of pole pieces made from a magnetically permeable material and the first portion of the shaft includes a single pole piece or combination of pole pieces and magnets with the pole piece being made of a magnetically permeable material; wherein the magnets rotate with the shaft.

5. The magnetic fluid sealing device of claim 1, wherein the shaft has a hollow core defining a passageway, channel, duct, or conduit.

6. The magnetic fluid sealing device of claim 1, wherein the seal established between the magnetic structure and the shaft separates a low pressure region in the apparatus from a region in the apparatus that is at atmospheric pressure.

7. The magnetic fluid sealing device of claim 6, wherein the region at atmospheric pressure includes the rolling element bearing and the second portion of the shaft.

8. The magnetic fluid sealing device of claim 1, wherein the compressible-ring is made from a polymer selected as one from the group of epoxies, polyesters, butyl rubbers, silicones, polyethers, polyurethanes, polyolefins, styrene block copolymers, polyvinyl chlorides, and mixtures or copolymers thereof.

9. The magnetic fluid sealing device of claim 1, wherein the cross-sectional diameter of the compressible-ring is greater than the depth of the groove in the shaft.

10. The magnetic fluid sealing device of claim 1, wherein the inner ring of the rolling element bearing is rotatable in relation to the outer ring.

11. The magnetic fluid sealing device of claim 1, wherein the housing further comprises a water cooling mechanism to remove the heat generated in the device when the shaft is rotated.

12. A method for assembling a magnetic fluid sealing device for use in an apparatus having rotatable components, the method comprising the steps of:
   providing a shaft rotatably mounted in the housing having an outer surface that defines a first portion and a second portion along its longitudinal axis (x);
   providing at least one groove that encircles the shaft in the second portion of the shaft;
   placing a compressible ring in the groove of the shaft, the cross-sectional diameter of the compressible ring being greater than the depth of the groove;
   providing a magnetic structure having an inner surface; the inner diameter of the structure is sized to encircle the outer surface of the shaft along its first portion, thereby creating a first radial gap;
   providing a rolling element bearing having an inner ring and an outer ring; the inner ring having an inner diameter sized to encircle the outer surface of the shaft along its second portion, thereby creating a second radial gap;
   providing a housing mounted to the apparatus;
   coupling the magnetic structure and the outer ring of the rolling element bearing to the housing such that the radial center of the annular magnetic structure is coaxially aligned with the radial center of the annular rolling element bearing;
   inserting the shaft through the inner ring of the rolling element bearing such that the compressible ring fills part of the second gap and makes contact with the inner ring;
   inserting the shaft through the inner diameter of the magnetic structure;

adding liquid locking material into the second gap such that the locking material extends axially beyond the groove;

allowing the locking material to harden;

placing a magnetic fluid into the first gap;

wherein the compressible ring radially aligns and centers the shaft along its longitudinal axis (x) with the rolling element bearing;

wherein the hardened locking material couples the shaft and compressible ring to the inner ring of the rolling element bearing;

wherein the magnetic fluid establishes a seal between the magnetic structure and the shaft.

13. The method of claim 12, wherein the method further comprises the steps of:

placing the magnetic fluid sealing device in a fixture to hold the shaft and rolling element bearing in radial alignment while the locking material hardens; and removing the magnetic fluid sealing device from the fixture after the locking material has hardened.

14. The method of claim 12, wherein the step of providing a shaft having an outer surface that defines a first portion and a second portion along its longitudinal axis (x) further comprises a shoulder that encircles the shaft and is intimately formed therewith; the surface of the shoulder being normal to the longitudinal axis (x) of the shaft;

wherein the shoulder in combination with the compressible ring holds the shaft in radial and axial alignment with the rolling element bearing while the locking material hardens.

15. The method of claim 12, wherein the method further comprises the step of:

cooling the housing to remove heat generated in the device when the shaft is rotated.

* * * * *